No. 752,431. PATENTED FEB. 16, 1904.
H. B. AULT.
AUTOMATIC SIGNALING APPARATUS FOR INCUBATORS OR HOTHOUSES.
APPLICATION FILED JULY 20, 1903.
NO MODEL.

WITNESSES:
D. W. Haynes
Jno. G. Nunnery

INVENTOR
H. B. Ault
BY
Clark Demuth
ATTORNEYS.

No. 752,431. Patented February 16, 1904.

UNITED STATES PATENT OFFICE.

HORACE BERTEN AULT, OF NEWMARKET, TENNESSEE.

AUTOMATIC SIGNALING APPARATUS FOR INCUBATORS OR HOTHOUSES.

SPECIFICATION forming part of Letters Patent No. 752,431, dated February 16, 1904.

Application filed July 20, 1903. Serial No. 166,418. (No model.)

*To all whom it may concern:*

Be it known that I, HORACE BERTEN AULT, a citizen of the United States, and a resident of Newmarket, county of Jefferson, and State of Tennessee, have invented certain new and useful Improvements in Automatic Signaling Apparatus for Incubators and Hothouses, of which the following is a specification, reference being had to the accompanying drawings, forming a part thereof, in which similar letters of reference indicate corresponding parts.

This invention relates to an automatic signaling apparatus for incubators and hothouses, the object thereof being to provide an efficient and continuously-operative means for indicating the temperature of an artificially-heated compartment at a given point remote from said compartment.

The invention embodies principally an adjustable double-action circuit-closing device of novel construction, which will be hereinafter fully described, and specifically set forth in the annexed claims.

Figure 1:
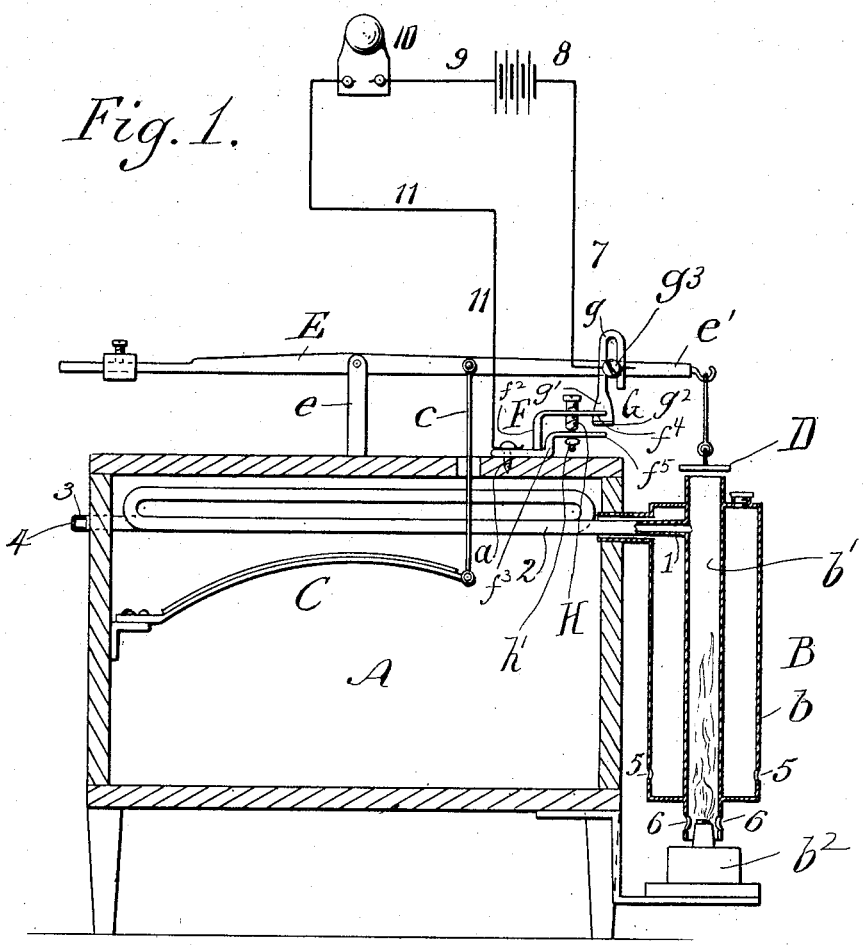
Figure 2:
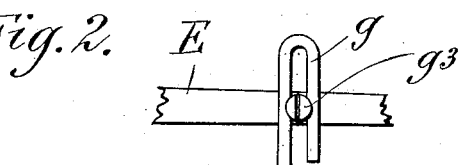
Figure 3:
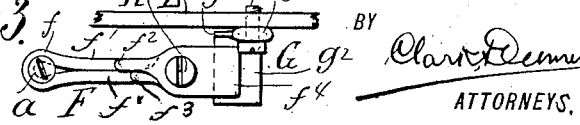

In the accompanying drawings, forming part of this specification, Figure 1 is a longitudinal sectional elevation of an incubator having my improvements attached thereto; Fig. 2, a side elevation, on an enlarged scale, of the circuit-closing device; and Fig. 3 is a plan view of said circuit-closing device.

In the drawings I have illustrated a common form of incubator, comprising the compartment A and heating apparatus B, which latter embodies the drum $b$, tubular heat-conducting chamber $b'$, and lamp $b^2$. Leading from the upper end of the chamber $b'$ is an outlet-pipe 1, which communicates with a heating-coil 2. This coil terminates at 3 and is provided with an outlet-opening 4 for discharging air exteriorly of the incubator. A supply of fresh air is admitted through the openings 5 of the drum $b$, and the air-supply of the lamp is taken in at 6.

As a means for maintaining an even temperature within the compartment A a thermostat C and damper D are employed. The thermostat is connected to a balanced beam E by means of a rod $c$. This said beam is pivoted to an upright $e$, located on the upper wall of the compartment A, and the damper D is suspended from one end of said beam over the outlet of the heating-chamber $b'$. In operation when the temperature within the compartment A is normal the parts relatively occupy the positions illustrated in Fig. 1 of the drawings; but should the compartment A become overheated the thermostat will expand and carry the end $e'$ of the beam and its suspended damper upwardly, thus allowing a considerable amount of hot air to escape and reducing the temperature. When the temperature of the compartment is sufficiently lowered, the contraction of the thermostat again carries the damper downwardly to throttle the escape of hot air. This apparatus is generally operative and effectual; but sometimes the parts, owing to various reasons, such as accidental blowing out or burning out of the lamp, causes the temperature to be maintained to an abnormal low degree for a sufficient length of time to retard or nullify the process of incubation. Then the contraction of the thermostat causes my contact-making device to act, and by means of my improvements such conditions are indicated at a given signal-station located at any desirable place, thus giving an operator a warning and admitting of the instant application of a remedy for the abnormal conditions. The device will also act in the event of the damper becoming accidentally seated and retained over the outlet of the tube $b'$ and cause continuous overheating of the incubator.

My contact-making device comprises the two parts F and G, which are composed of good conducting material, such as copper. Preferably each part is composed of a single piece of copper wire. The part F embodies the horizontal loop $f$, having the closely-parallel extensions $f'$, which are respectively provided with the flattened end parts or plates $f^4$ $f^5$, which are extended horizontally and parallel with each other, one above the other. These plates are connected by means of a screw H, which threads through the upper plate $f^4$ and has a contracted lower end part which loosely passes through an opening in the lower plate $f^5$ and engages a nut, whereby by turning the screw the distance between the outer ends or contact-points of the plates may be increased or decreased. The part G embodies a vertical loop $g$, a flattened part $g'$, and a horizontal extension $g^2$.

In use the part G is secured to the beam E by means of a screw $g^3$, and the part H is secured to the upper wall of the compartment A by means of a screw $a$. Leading from the part G and fastened thereto by means of the screw $g^3$ is a conductor 7, which connects to one pole of a battery 8. From the other pole of the battery a conductor 9 leads to the bell or other signaling device, as 10, and the circuit is completed by means of a conductor 11, which is fastened in electrical contact with the part F by means of the screw $a$. The part G is adjusted on the beam E, so that the contact-plate $g'$ thereof normally maintains a position midway between the contact-plates $f^4$ and $f^5$, whereby a normally broken circuit is maintained, and the length of movement up and down allowed to the plate $g$ is fixed by means of the adjusting-screw H.

In the operation and use of the device, while normal conditions of temperature are maintained within the compartment A, the circuit is maintained open or broken; but should abnormal conditions occur which would make electrical contact between the plate $g'$ and plate $f^4$ or the plate $g'$ and $f^5$ the circuit is closed, so that the signaling device 7 becomes operative, whereby a watcher can be warned and remedy defects before any harm is done.

Having now described my invention, what I claim as new, and desire to secure by Letters Patent, is—

1. A circuit-closing device comprising the parallel contact-plates $f^4$ and $f^5$, and means connecting them, and the adjusting-screw, and the plate $g'$, and means integral therewith for connection with a movable object, the latter plate adapted to move between the first-named plates and contact alternately with them for making a circuit, substantially as shown and described.

2. A circuit-closing device, comprising the parallel longitudinally-extended contact-plates having the looped extension, and the adjusting-screw engaging said plates, and the intermediate plate having the loop for attachment to a swinging beam, substantially as shown and described.

3. As a circuit-closing device for attachment to an incubator, the combination with the longitudinally-extended contact-plates having the looped extension and the adjusting-screw, and the intermediate plate adapted to alternately contact with the said plates, said plate having a vertical looped extension, whereby the same may be placed vertically adjustable on a pivoted beam, substantially as shown and described.

4. As an alarm for heated compartments, the combination with a balanced beam, of the longitudinally-extended contact-plates having the looped horizontal extension forming a base for connection to a fixed point, and the adjusting-screw engaging said plates, and the intermediate plate located between the said plates and having a vertical looped extension engaging the said beam, and means fastening the same to the beam, and the normally opened circuit, comprising a source of electricity, signaling device and conductors, substantially as shown and described.

In testimony that I claim the foregoing as my invention I have signed my name, in presence of two witnesses, this 16th day of May, 1903.

HORACE BERTEN AULT.

Witnesses:
    JAMES HIGHTON HUDSON,
    LAFAYETTE HUDSON.